(12) United States Patent
Funakoshi

(10) Patent No.: US 7,489,353 B2
(45) Date of Patent: Feb. 10, 2009

(54) SOLID STATE IMAGING DEVICE AND METHOD FOR DRIVING THE SAME

(75) Inventor: Jun Funakoshi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 739 days.

(21) Appl. No.: 10/925,919

(22) Filed: Aug. 26, 2004

(65) Prior Publication Data
US 2005/0206762 A1 Sep. 22, 2005

(30) Foreign Application Priority Data
Mar. 17, 2004 (JP) ............... 2004-076909

(51) Int. Cl.
*H04N 3/14* (2006.01)
*H04N 5/235* (2006.01)

(52) U.S. Cl. .................. 348/296; 348/362; 348/308

(58) Field of Classification Search ............. 348/296, 348/362, 308; 250/208.1; 257/291; 358/482
See application file for complete search history.

(56) References Cited

U.S. PATENT DOCUMENTS

| 5,083,016 | A  | * | 1/1992  | Wyles et al. ............. 250/208.1 |
| 6,507,365 | B1 |   | 1/2003  | Nakamura et al. |
| 6,529,242 | B1 | * | 3/2003  | Panicacci .................... 348/362 |
| 6,590,611 | B1 |   | 7/2003  | Ishida et al. |
| 6,657,177 | B2 |   | 12/2003 | Goto |
| 6,801,256 | B1 | * | 10/2004 | Egawa et al. ................ 348/302 |
| 6,847,398 | B1 | * | 1/2005  | Fossum ....................... 348/296 |
| 7,057,655 | B1 | * | 6/2006  | Masuyama .................. 348/296 |
| 2004/0130757 | A1 | * | 7/2004 | Mabuchi ..................... 358/482 |

FOREIGN PATENT DOCUMENTS

| JP | 2000-125203 | 4/2000 |
| JP | 2001-008109 | 1/2001 |

OTHER PUBLICATIONS

Korean Office Action dated Feb. 21, 2006.

* cited by examiner

*Primary Examiner*—Nhan T Tran
(74) *Attorney, Agent, or Firm*—Arent Fox LLP

(57) ABSTRACT

A method for driving a solid state imaging device which prevents the generation of electronic shutter noise even when the integration time for exposure of a pixel region fluctuates. The solid state imaging device performs a rolling shutter operation that sequentially selects a reset row and a read row separated from each other in accordance with a row spacing based on integration time in the pixel array. A dummy row is selected when a reset row or a read row is not selected. The method includes selecting a dummy reset row so that the total of the number of the reset rows and the reset dummy rows that are simultaneously selected is constant regardless of the number of simultaneously selected reset rows.

17 Claims, 4 Drawing Sheets

SOLID STATE IMAGING DEVICE AND METHOD FOR DRIVING THE SAME

CROSS-REFERENCE TO RELATED APPLICATIONS

This application is based upon and claims priority from Japanese Patent Application No. 2004-076909 filed on Mar. 17, 2004, the contents of which is herein incorporated in its entirety by reference.

BACKGROUND OF THE INVENTION

The present invention relates to a solid state imaging device provided with an imaging element, such as a CMOS image sensor.

An XY address-type solid state imaging device includes a plurality of imaging elements arranged in a matrix. An image of an object is acquired by scanning the imaging elements in a vertical direction. During this imaging operation, that is, during the operation of an electronic shutter, the electrical charge stored in each imaging element is reset in response to a reset signal. After the reset, the charge stored by each imaging element is read according to a read signal. During the electronic shutter operation, when the input timing of the reset signal and read signal are not appropriate, a band-like electronic shutter noise (difference in brightness level or difference in contrast level) is generated. The shutter noise extends along a horizontal direction in the image. In order to stably obtain high quality images, the generation of such electronic shutter noise must be suppressed.

FIG. 1 shows the pixel array of an XY address-type solid state imaging device. Pixel regions 1 are arranged in a matrix. Each pixel region 1 is connected to a vertical selection line CL and a horizontal selection line SLCT. A photoelectric conversion element, such as a photodiode 2, is formed in each pixel region 1.

In each pixel region 1, an n-channel MOS transistor Tr1 is connected to a power supply VDD, which supplies reset voltage. The cathode of a photodiode 2 is connected to the n-channel MOS transistor Tr1. Accordingly, the reset voltage is supplied through the n-channel MOS transistor Tr1 to the cathode of the photodiode 2. Furthermore, a low potential power supply VSS is connected to the anode of the photodiode 2. A reset signal line RST is connected to the gate of the transistor Tr1.

The source of the transistor Tr1 is connected to the gate of an n-channel MOS transistor Tr2. The drain of the transistor Tr2 is connected to the power supply VDD. The source of the transistor Tr2 is connected to the vertical selection line CL via an n-channel MOS transistor Tr3. The gate of the transistor Tr3 is connected to the horizontal selection line SLCT.

During the imaging operation, the reset signal lines RST are sequentially selected by a reset control circuit. The transistor Tr1 of the pixel region 1 connected to the selected reset signal line RST is turned ON, a photodiode 2 is reset by the reset voltage level of the power supply VDD, and exposure of the photodiode 2 is started. The photodiode 2 is discharged in accordance with the amount of exposure.

Subsequently, the horizontal selection lines SLCT are sequentially selected in accordance with the operation of a vertical scan shift register. The transistor Tr3 connected to the selected horizontal selection line SLCT is turned ON. The pixel data corresponding to the charge potential at the photodiode 2 is output to the associated vertical selection line CL.

A column parallel reading circuit simultaneously reads pixel data, which is read from each pixel region 1 in one horizontal row of the pixel array, through all the vertical selection lines CL. Then, the pixel data is sequentially selected by the horizontal scan shift register and output from an output circuit.

When an imaging device is operated in a so-called rolling shutter mode, the selection of the reset signal lines RST, that is, the selection of the reset row, and the selection of the horizontal selection line SLCT, that is, the selection of the read row, are performed simultaneously. FIG. 2 shows the pixel array at a specific timing. At this time, row L1 is undergoing a reset process, and row L2 is undergoing a read process. The reset row L1 and the read row L2 are separated from each other by a predetermined row spacing L. At the next timing, the reset row L1 and the read row L2 are shifted downward by one row. The row spacing L corresponds to the time from when the reset operation is performed to when the read operation is performed, that is, the integration time (exposure time) of each photodiode 2.

FIG. 3 shows the timing of a rolling shutter operation when the interval between a reset operation AC1 and a read operation AC2 is equivalent to the time for scanning 100 rows (that is, the row spacing L is 100 rows). The total number of rows of the pixel regions 1 is 640, and the vertical blanking period is equivalent to the time for scanning 45 rows.

When the imaging operation of the initial frame FL1 begins, the reset operation AC1 starts to sequentially select the reset signal lines RST. After period t1, which is equivalent to the time for resetting 100 rows, the read operation AC2 is started to sequentially select the horizontal selection lines SLCT. After period t2, the reset operation AC1 of frame FL1 ends. After period t3, the read operation AC2 of frame FL1 ends. Then, when the vertical blanking period t4 which is equivalent to the time for scanning 45 rows elapses, the imaging operation of the first frame FL1 ends, and the reset operation AC1 of the next frame starts.

When each frame is processed, only the reset operation ACL is performed at period t1. At period t2, the reset operation AC1 and the read operation AC2 are performed in parallel (simultaneously). At period t3, only the read operation AC2 is performed. At period t2 during which the two operations of reset and read are performed simultaneously, the load on the power supply VDD is high compared to periods t1 and t3 during which only one of the reset or read operation is performed. Therefore, at period t2, the level of the power supply VDD may be reduced. Fluctuation of the level of the power supply VDD would affect the reset operation AC1 or the read operation AC2 and generate a horizontal band-like electronic shutter noise generated on the imaging screen.

To solve this problem, an imaging device has been proposed to level the load on the power supply VDD by providing a plurality of dummy rows in the pixel array. For example, as shown in FIG. 3, a reset operation is performed on the dummy rows at periods t3 and t4 during which the reset operation AC1 is not performed. A read operation is performed for the dummy rows at periods t1 and t4 during which the read operation is not performed.

In this way, one row always undergoes the reset operation and the read operation. This levels the load on the power supply VDD, suppresses fluctuation of the power supply VDD, and prevents the generation of an electronic shutter noise.

Japanese Laid-Open Patent Publication No. 2001-8109 and Japanese Laid-Open Patent Publication No. 2000-125203 each describe an imaging device in which a reset operation is performed on dummy rows from when a reset operation ends to when a read operation ends.

SUMMARY OF THE INVENTION

One aspect of the present invention is a method for driving an imaging device provided with a pixel array unit including a plurality of pixel rows and a plurality of dummy rows. The imaging device is operable in a rolling shutter mode. The method includes sequentially selecting a read row and at least one reset row from the pixel array. One of the at least one reset row is separated from the read row by a row spacing corresponding to an integration time. The method further includes selecting a number of dummy reset rows adjusted so that the total of the number of currently selected reset rows and the number of dummy reset rows is constant.

Another aspect of the present invention is a method for driving an imaging device provided with a pixel array including a plurality of pixel rows and a plurality of dummy rows. The imaging device is operable in a rolling shutter mode. The method includes sequentially selecting a read row and at least one reset row from the pixel array. One of the at least one reset row is separated from the read row by a row spacing corresponding to an integration time. The method further includes selecting a dummy read row when a read row is not selected, and selecting a number of dummy reset rows adjusted so that the total of the number of currently selected reset rows, the number of dummy reset rows, the number of read rows, and the number of dummy read rows is constant.

A further aspect of the present invention is a method for driving an imaging device provided with a pixel array including a plurality of pixel rows and a plurality of dummy rows. The imaging device is operable in a rolling shutter mode. The method includes sequentially selecting a read row and at least one reset row from the pixel array. One of the at least one reset row is separated from the read row by a row spacing corresponding to an integration time. The method further includes selecting a number of dummy reset rows in accordance with the number of currently selected reset rows. Two dummy reset rows are selected when the number of currently selected reset rows is zero, one dummy reset row is selected when the number of currently selected reset rows is one, and no dummy reset rows are selected when the number of currently selected reset rows is two.

Another aspect of the present invention is a method for driving an imaging device provided with a pixel array including a plurality of pixel rows and a plurality of dummy rows. The imaging device is operable in a rolling shutter mode. The method includes sequentially selecting a read row and at least one reset row from the pixel array. One of the at least one reset row is separated from the read row by a row spacing corresponding to an integration time. The method further includes selecting a dummy read row without selecting a read row, selecting a read row without selecting a dummy read row, selecting two dummy reset rows without selecting a reset row, selecting one reset row and one dummy reset row, and selecting two reset rows without selecting a dummy reset row.

A further aspect of the present invention is an imaging device provided with a pixel array including a plurality of pixel rows, a dummy array including at least one dummy reset row and at least one dummy read row, and a vertical scan timing control circuit for sequentially selecting a read row and at least one reset row from the plurality of pixel rows. One of the at least one reset row is separated from the one read row by a row spacing corresponding to an integration time. The vertical scan timing control circuit selects a number of dummy reset rows adjusted so that the total of the number of currently selected reset rows and the number of dummy reset rows is constant.

Another aspect of the present invention is an imaging device provided with a pixel array, including a plurality of pixel rows, for acquiring a signal during a period from when a reset row is selected to when a read row is selected. A plurality of dummy reset rows are selected when there is no reset row that is to be selected in the pixel array.

A further aspect of the present invention is an imaging device provided with a pixel array including a plurality of pixel rows for acquiring a signal during a period from when a reset row is selected to when a read row is selected. A plurality of dummy reset rows are selected when there is no reset row that is to be selected in the pixel array. The number of the dummy reset rows is the same as at least the maximum number of simultaneously selected reset rows.

A further aspect of the present invention is a method for driving an imaging device having a pixel array including a plurality of rows, a dummy read row, a first dummy reset row, and a second dummy reset row. The method includes resetting a reset row and the first dummy reset row in parallel with reading the dummy read row, and resetting a reset row in parallel with reading a read row, separated from the reset row by a row spacing corresponding to an integration time, and the dummy read row. The method further includes reading a read row in parallel with resetting the first and second dummy reset rows, reading the dummy read row in parallel with resetting the first and second dummy reset rows, and reading one read row in parallel with resetting two reset rows.

Another aspect of the present invention is an imaging device operable for a period in a rolling shutter mode in which integration time is changeable. The device is provided with a pixel array including a plurality of pixel rows and a dummy array including a dummy read row, a first dummy reset row, and a second dummy reset row. A vertical scan timing control circuit selects a fixed number of rows from the plurality of pixel rows, the dummy read row, and the first and second dummy reset rows during the period in which the imaging device operates in the rolling shutter mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 3:
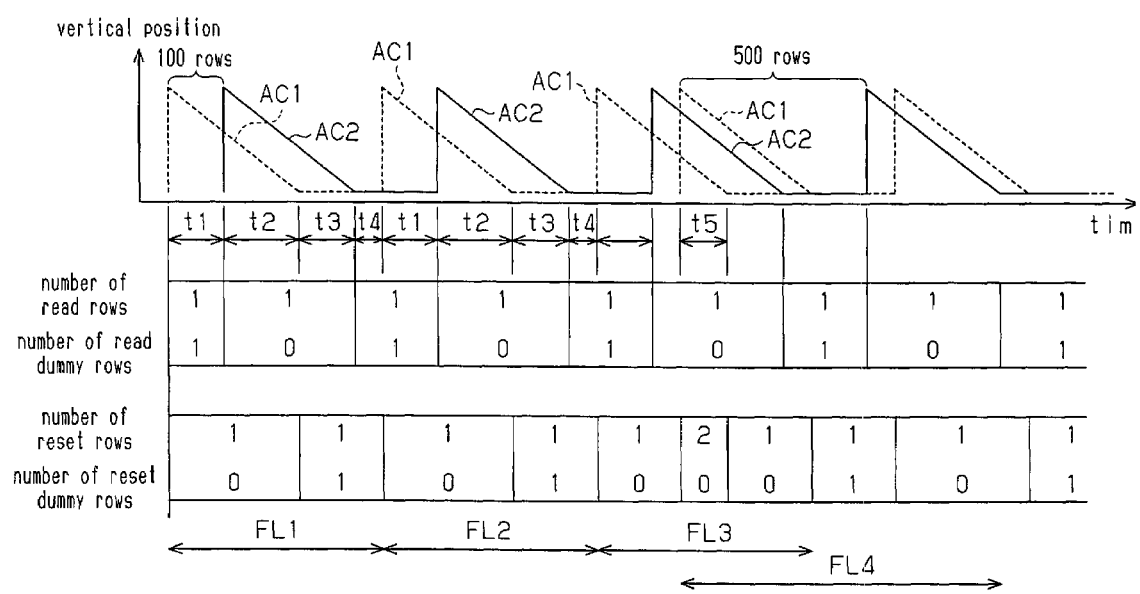
FIG. 3 is a timing chart showing the selection of a dummy row in the prior art.

During the imaging operation in each of the above-mentioned prior art imaging devices, the integration time of each pixel region must be increased when the brightness of the imaged object decreases. For example, referring to FIG. 3, in frames FL1 through FL3, the period between the reset operation AC1 and the read operation AC2 corresponds to 100 rows. However, in frame FL4, the period between the reset operation AC1 and the read operation AC2 corresponds to 500 rows.

Since the read operation AC2 has a fixed cycle, the reset operation AC1 is performed 500 rows before the read operation AC2 when starting frame FL4. That is, at period t5, the reset operation AC1 of frame FL4 is performed in parallel with frame FL3. In other words, when the reset operation is performed for two rows at period t5, a read operation AC2 is performed in parallel for one row. As a result, the load of the power supply VDD fluctuates at period t5 and generates electronic shutter noise in the acquired image of frame FL3 or FL4.

The present invention provides a method for driving a solid state imaging device which prevents electronic shutter noise from being produced even when the integration time for exposing pixel regions changes.

Figure 1:
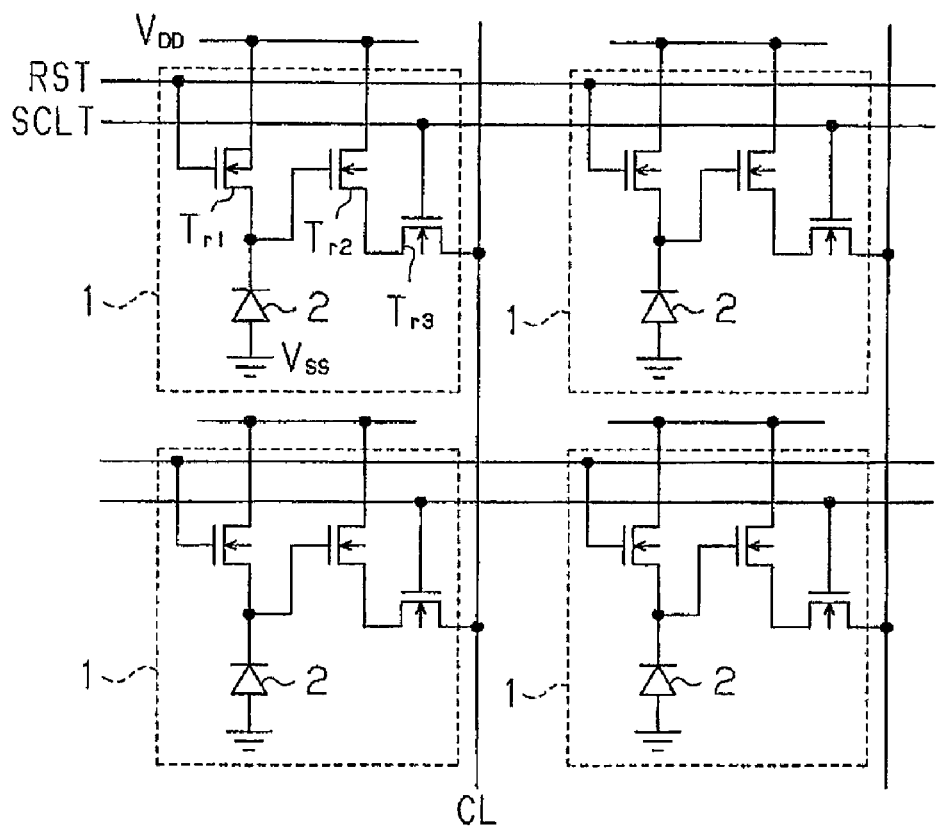
FIG. 1 is a circuit diagram of typical pixels.
Figure 2:
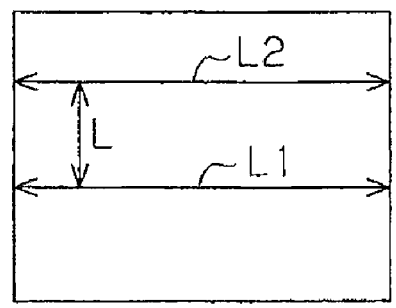
FIG. 2 is a schematic diagram showing a pixel array during a rolling shutter operation.
Figure 5:
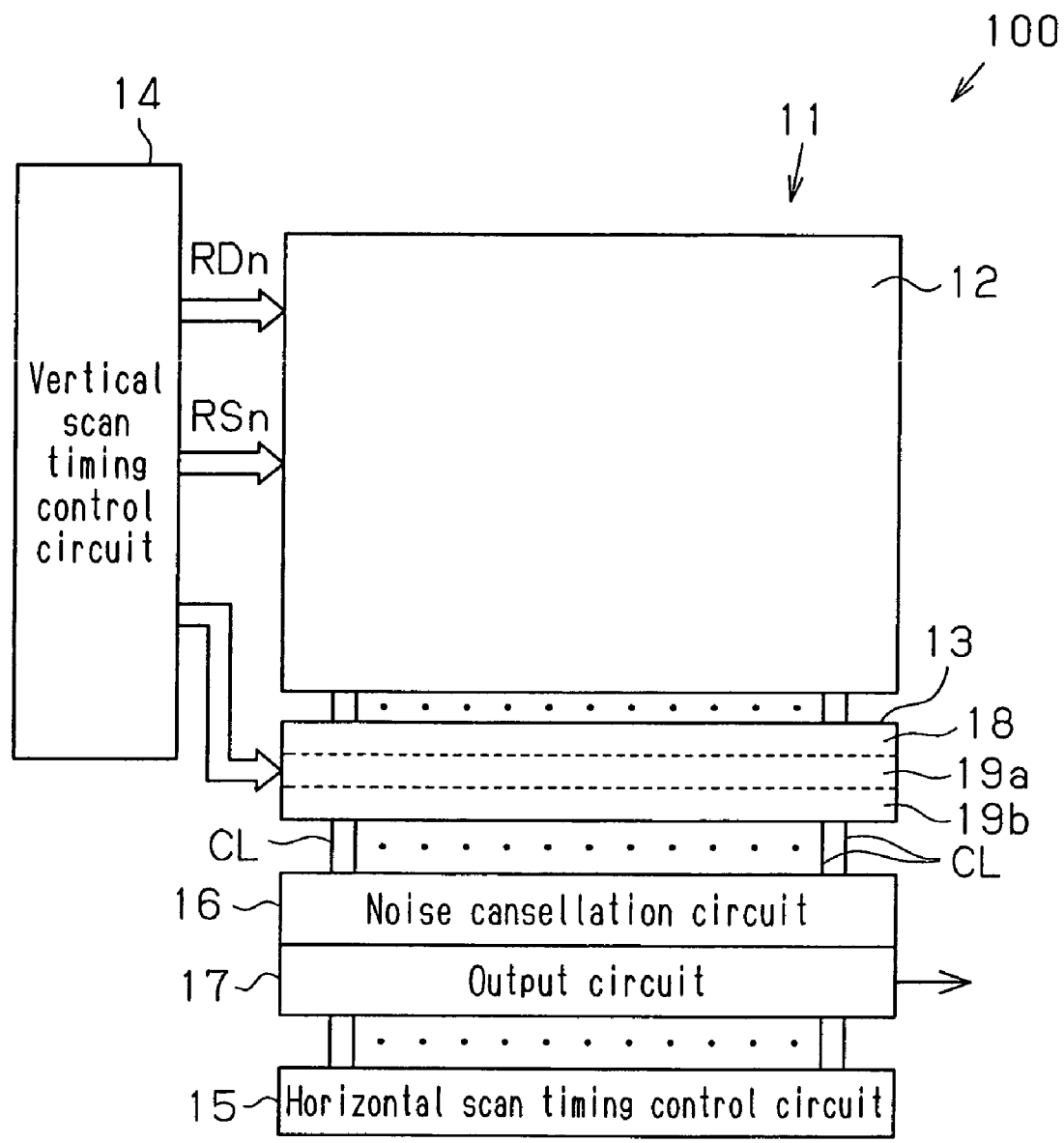
FIG. 5 is a schematic block diagram showing an imaging device according to a preferred embodiment of the present invention.

A method for driving a solid state imaging device according to a preferred embodiment of the present invention will now be described. As shown in FIG. 5, a solid state imaging device 100 is provided with a pixel array unit 11 including a pixel array 12 and a three-row dummy array 13 adjacent to the pixel array 12. The pixel array 12 and the dummy array 13 include a plurality of pixel regions arrayed in a matrix pattern. Each pixel region is connected to a reset signal line RST, a horizontal selection line SLCT, and a vertical selection line CL. The configuration of each pixel region is identical to that shown in FIG. 1.

A vertical scan timing control circuit 14 controls the reset operation and read operation of the pixel array 12 and the dummy array 13. The reset signal lines RST are sequentially selected within the pixel array 12 in accordance with a reset signal RSn output from a reset control circuit in the vertical scan timing control circuit 14. The horizontal selection lines SLCT are sequentially selected within the pixel array 12 in accordance with a read signal RDn output from a vertical scan shift register in the vertical scan timing control circuit 14. Pixel data from the pixel region that is connected to the selected horizontal selection line SLCT is output to the associated vertical selection line CL.

A horizontal scan timing control circuit 15 selects a vertical selection line CL. The pixel data of the selected vertical selection line CL is sequentially output from an output circuit 17 through a noise cancellation circuit 16.

The dummy array 13 includes one dummy read row 18 and two dummy reset rows 19a and 19b. Further, the dummy array 13 is controlled by the vertical scan timing control circuit 14.

The vertical scan timing control circuit 14 selects the dummy read row 18 in each frame during an imaging operation when the horizontal selection line SLCT selection operation is not being performed in the pixel array 12, that is, when the read operation is not being performed. However, the vertical scan timing control circuit 14 does not select the dummy read row 18 when the horizontal selection line SLCT selection operation is being performed.

The vertical scan timing control circuit 14 selects the two dummy reset rows 19a and 19b when the reset signal line RST selection operation is not being performed in the pixel array 12, that is, when the reset operation is not being performed. The vertical scan timing control circuit 14 selects only the dummy reset row 19a when one reset signal line RST is selected. The vertical scan timing control circuit 14 does not select any of the dummy reset rows 19a and 19b when two reset signal line RST selection operations are performed in parallel.

This operation is based on the logic of the selection signals of the reset signal line RST and the horizontal selection line SLCT.

Figure 4:
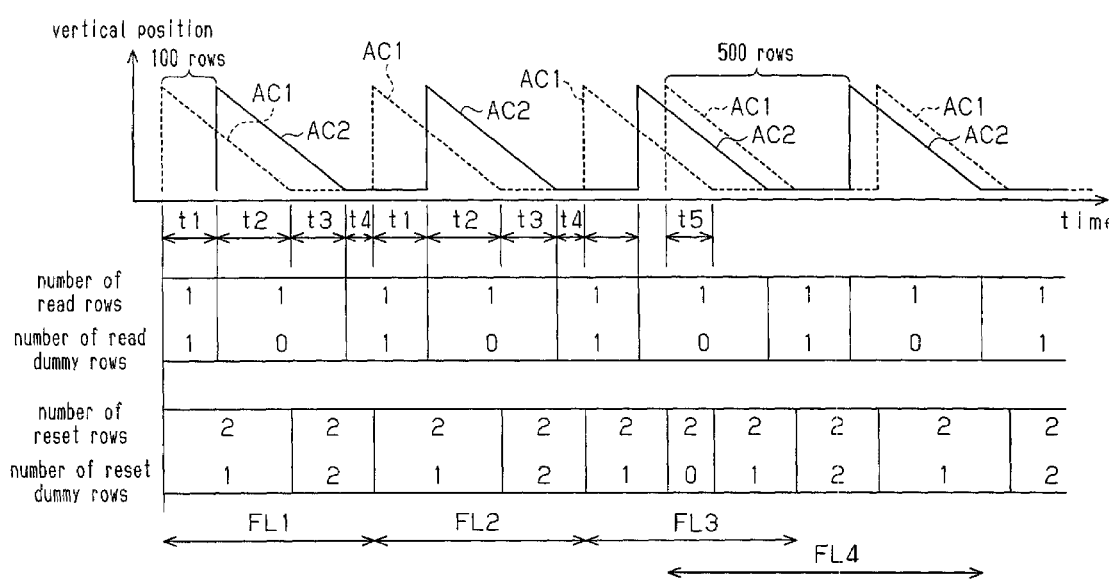
FIG. 4 is a timing chart showing the selection of a dummy row according to a preferred embodiment of the present invention.

The operation of the imaging device 100 will now be described with reference to FIG. 4. In the same manner as the prior art described above, FIG. 4 shows the timing of an operation when the interval between a reset operation AC1 and a read operation AC2 is equivalent to the time for scanning 100 rows (that is, the row spacing L is 100 rows). The total number of rows of the pixel regions 1 is 640, and the vertical blanking period is equivalent to the time for scanning 45 rows.

When the imaging operation of the first frame FL1 begins, the reset operation AC1 for sequentially selecting the reset signal line RST starts. The read operation AC2 for sequentially selecting the horizontal selection line SLCT starts after period t1, which is equivalent to the time for resetting 100 rows. The reset operation AC1 of frame FL1 ends after period t2. The read operation AC2 of frame FL1 ends after period t3. When the vertical blanking period t4, which is equivalent to the time for scanning 45 rows, elapses, the imaging operation of the first frame FL1 ends, and the reset operation AC1 of the next frame FL2 starts.

During the processing of each frame in this imaging operation, only the reset operation AC1 is performed at period t1. At this time, the vertical scan timing control circuit 14 selects the dummy read row 18 and does not perform the selection operation on the horizontal selection lines SLCT. Furthermore, the vertical scan timing control circuit 14 performs the selection operation on the reset signal lines RST, selects one reset row, and selects the dummy reset row 19a. Accordingly, when one row is read, two reset rows are selected in parallel.

Next, at period t2, the reset operation AC1 and the read operation AC2 are performed in parallel. At this time, the vertical scan timing control circuit 14 performs the selection operation on the horizontal selection lines SLCT but does not select the dummy read row 18. Furthermore, the vertical scan timing control circuit 14 performs the selection operation on the reset signal lines RST, selects one reset row, and selects the dummy reset row 19a. Accordingly, when one row is read, two reset rows are selected in parallel.

Then, at period t3, only the read operation AC2 is performed. At this time, the vertical scan timing control circuit 14 performs the selection operation on the horizontal selection lines SLCT but does not select the dummy read row 18. Furthermore, the vertical scan timing control circuit 14 selects the two dummy reset rows 19a and 19b but does not perform the selection operation on the reset signal lines RST. Accordingly, when one row is read, two reset rows are selected in parallel.

The integration time (exposure time) of each pixel region increases when the brightness of the scanning object decreases during the imaging operation of the imaging device 100. For example, in frame FL4, the period between the reset operation AC1 and the read operation AC2 is changed to 500 rows. The reset operation AC1 is performed 500 rows before the read operation AC2, which has a fixed cycle. Thus, at period t5, the reset operations AC1 of frames FL3 and FL4 are performed in parallel.

At period t5, the vertical scan timing control circuit 14 performs two selection operations on the reset signal lines RST and one selection operation on the horizontal selection line SLCT in parallel. The vertical scan timing control circuit 14 performs the selection operation on the horizontal selection lines SLCT but does not select the dummy read row 18. Furthermore, the vertical scan timing control circuit 14 performs two selection operations on the reset signal line RST but does not select the dummy reset row. Accordingly, when one row is read, two reset rows are selected in parallel.

The imaging device 100 of the preferred embodiment has the advantages described below.

(1) In each frame of an imaging operation, the interval between the reset operation AC1 and the read operation AC2 (equivalent to period t1) is constant, and the vertical scan timing control circuit 14 selects the dummy read row 18 when the read operation AC2 is not performed. Further, the vertical scan timing control circuit 14 selects the dummy reset rows 19a and 19b when the reset operation AC1 is not performed. Accordingly, the load on the power supply VDD is constant when only the reset operation AC1 is performed, when only the read operation AC2 is performed, when the reset operation AC1 and the read operation AC2 are performed in parallel, and when the reset operation AC1 and the read operation AC2 are not performed. This suppresses fluctuation of the level of the power supply VDD. Accordingly, the generation of electronic shutter noise in the imaging screen is prevented.

(2) The imaging device 100 is provided with two dummy reset rows 19a and 19b. The vertical scan timing control circuit 14 selects the two dummy reset rows 19a and 19b when the reset operation AC1 is not performed, selects one dummy reset row 19a when the reset operation AC1 is performed for one row, and does not select a dummy reset row when the reset operation AC2 is performed for two rows. Accordingly, the total number of the selected reset rows and dummy reset rows is always two rows. This suppresses fluctuation of the load on the power supply VDD.

(3) Fluctuation of the load on the power supply VDD during the imaging operation is suppressed as described above even when reset operations AC1 are performed in parallel for two consecutive frames (period t5).

(4) The same dummy read row 18 or the same dummy reset row 19a and 19b is repeatedly and consecutively selected. Accordingly, the noise elimination effect of the noise cancellation circuit 16 is improved since the dummy operation is always additionally performed under identical conditions for each row in the pixel array 12 that undergoes a read operation or a reset operation. That is, when a plurality of dummy rows are sequentially selected as described in Japanese Laid-Open Patent Publication No. 2001-8109, there is a possibility that the operation condition (exposure condition) not being the same for each dummy row. In contrast, in the preferred embodiment, when imaging data read consecutively from each vertical selection line CL is sequentially added to eliminate noise with the noise cancellation circuit 16 using a correlation double sampling technique, the integration time of each dummy row is always one row. This improves the noise elimination effect.

It should be apparent to those skilled in the art that the present invention may be embodied in many other specific forms without departing from the spirit or scope of the invention. Particularly, it should be understood that the present invention may be embodied in the following forms.

There may be two or more dummy read rows and three or more dummy reset rows.

When the imaging device simultaneously performs a plurality of read operations, a plurality of dummy read rows may be used. This would suppress load fluctuation when reading a plurality of rows.

The present examples and embodiments are to be considered as illustrative and not restrictive, and the invention is not to be limited to the details given herein, but may be modified within the scope and equivalence of the appended claims.

What is claimed is:

1. A method for driving an imaging device provided with a pixel array unit including a plurality of pixel rows and a plurality of dummy rows, the imaging device being operable in a rolling shutter mode, the method comprising:
   sequentially selecting a read row and at least one reset row from the pixel array, wherein one of the at least one reset row is separated from the read row by a row spacing corresponding to an integration time of the imaging device; and
   selecting a number of dummy reset rows adjusted so that the total of the number of currently selected reset rows and the number of currently selected dummy reset rows is constant during the period in which the imaging device operates in the rolling shutter mode, the period including a transition period in which two consecutive frames are simultaneously processed.

2. A method for driving an imaging device provided with a pixel array including a plurality of pixel rows and a plurality of dummy rows, the imaging device being operable in a rolling shutter mode, the method comprising:
   sequentially selecting a read row and at least one reset row from the pixel array, wherein one of the at least one reset row is separated from the read row by a row spacing corresponding to an integration time of the imaging device;
   selecting a dummy read row when a read row is not selected; and
   selecting a number of dummy reset rows adjusted so that the total of the number of currently selected reset rows, the number of currently selected dummy reset rows, the number of currently selected read rows, and the number of currently selected dummy read rows is constant during the period in which the imaging device operates in the rolling shutter mode, the period including a transition period in which two consecutive frames are simultaneously processed.

3. The method of claim 2 further comprising:
   consecutively selecting a same dummy row when the dummy read row and dummy reset row are selected.

4. A method for driving an imaging device provided with a pixel array including a plurality of pixel rows and a plurality of dummy rows, the imaging device being operable in a rolling shutter mode, the method comprising:
   sequentially selecting a read row and at least one reset row from the pixel array, wherein one of the at least one reset row is separated from the read row by a row spacing corresponding to an integration time of the imaging device; and
   selecting a number of dummy reset rows in accordance with the number of currently selected reset rows, wherein two dummy reset rows are selected when the number of currently selected reset rows is zero, one dummy reset row is selected when the number of currently selected reset rows is one, and no dummy reset rows are selected when the number of currently selected reset rows is two.

5. A method for driving an imaging device provided with a pixel array including a plurality of pixel rows and a plurality of dummy rows, the imaging device being operable in a rolling shutter mode, the method comprising:
   sequentially selecting a read row and at least one reset row from the pixel array, wherein one of the at least one reset row is separated from the read row by a row spacing corresponding to an integration time of the imaging device;

selecting a dummy read row without selecting a read row;

selecting a read row without selecting a dummy read row;

simultaneously selecting two dummy reset rows without selecting a reset row;

simultaneously selecting one reset row and one dummy reset row; and simultaneously selecting two reset rows without selecting a dummy reset row.

6. An imaging device operable in a rolling shutter mode, comprising:

a pixel array including a plurality of pixel rows;

a dummy array including at least one dummy reset row and at least one dummy read row; and a vertical scan timing control circuit for sequentially selecting a read row and at least one reset row from the plurality of pixel rows, wherein one of the at least one reset row is separated from the one read row by a row spacing corresponding to an integration time, wherein the vertical scan timing control circuit selects a number of dummy reset rows adjusted so that the total of the number of currently selected reset rows and the number of currently selected dummy reset rows is constant during the period in which the imaging device operates in the rolling shutter mode, the period including a transition period in which two consecutive frames are simultaneously processed.

7. The imaging device of claim 6, wherein the vertical scan timing control circuit:

selects a dummy read row when a read row is not selected; and selects a number of dummy reset rows adjusted so that the total of the number of currently selected reset rows, the number of currently selected dummy reset rows, the number of currently selected read rows, and the number of currently selected dummy read rows is constant.

8. The imaging device of claim 7, wherein the vertical scan timing control circuit:

selects two dummy reset rows when the number of currently selected reset rows is zero;

selects one dummy reset row when the number of currently selected reset rows is one; and selects no dummy reset rows when the number of currently selected reset rows is two.

9. The imaging device of claim 7, wherein the vertical scan timing control circuit:

selects no dummy read row when the read row is selected;

selects two dummy reset rows when the number of currently selected reset rows is zero;

selects one dummy reset row when the number of currently selected reset rows is one; and selects no dummy reset rows when the number of currently selected reset rows is two.

10. The imaging device of claim 6, wherein the dummy array includes one dummy read row and two dummy reset rows, and the vertical scan timing control circuit consecutively selects a same dummy row when the dummy read row and the dummy reset row are selected.

11. An imaging device operable in a rolling shutter mode comprising:

a pixel array, including a plurality of pixel rows, for acquiring a signal during a period from when a reset row is selected to when a read row is selected;

a plurality of dummy reset rows selected when there is no reset row that is to be selected in the pixel array; and a controller selecting a number of dummy reset rows adjusted so that the total of currently selected reset rows and currently selected dummy reset rows is constant during the period in which the imaging device operates in the rolling shutter mode, the period including a transition period in which two consecutive frames are simultaneously processed.

12. An imaging device operable in a rolling shutter mode comprising:

a pixel array including a plurality of pixel rows for acquiring a signal during a period from when a reset row is selected to when a read row is selected;

a plurality of dummy reset rows selected when there is no reset row that is to be selected in the pixel array, the number of the dummy reset rows being the same as at least the maximum number of simultaneously selected reset rows; and a controller selecting a number of dummy reset rows adjusted so that the total of currently selected reset rows and currently selected dummy reset rows is constant during the period in which the imaging device operates in the rolling shutter mode, the period including a transition period in which two consecutive frames are simultaneously processed.

13. A method for driving an imaging device having a pixel array including a plurality of rows, a dummy read row, a first dummy reset row, and a second dummy reset row, the method comprising:

resetting a reset row and the first dummy reset row in parallel with reading the dummy read row;

resetting a reset row in parallel with reading a read row, separated from the reset row by a row spacing corresponding to an integration time, and the dummy read row;

reading a read row in parallel with resetting the first and second dummy reset rows;

reading the dummy read row in parallel with resetting the first and second dummy reset rows; and reading one read row in parallel with resetting two reset rows.

14. An imaging device operable for a period in a rolling shutter mode in which integration time is changeable, the device comprising:

a pixel array including a plurality of pixel rows;

a dummy array including a dummy read row, a first dummy reset row, and a second dummy reset row; and a vertical scan timing control circuit for selecting a fixed number of rows from the plurality of pixel rows, the dummy read row, and the first and second dummy reset rows during the period in which the imaging device operates in the rolling shutter mode, the period including a transition period in which two consecutive frames are simultaneously processed.

15. The imaging device of claim 14, wherein the vertical scan timing control circuit:

resets the first dummy reset row when one reset row is reset in the plurality of pixel rows;

resets both of the first and second dummy reset rows when none of the plurality of pixel rows are reset; and selects neither the first dummy reset row nor the second dummy reset row when two reset rows are reset in the plurality of pixel rows.

16. The imaging device of claim 14, wherein the vertical scan timing control circuit:

resets a reset row and the first dummy reset row and simultaneously reads the dummy read row;

resets a reset row and simultaneously reads a read row, separated from the reset row by a row spacing corresponding to an integration time, and the dummy read row;

reads a read row and simultaneously resets the first and second dummy reset rows;

reads the dummy read row and simultaneously resets the first and second dummy reset rows; and reads one read row and simultaneously resets two reset rows.

17. The imaging device of claim 14, wherein the vertical scan timing control circuit selects the fixed number of rows even if the integration time has been changed.

* * * * *